(12) United States Patent
Gehman et al.

(10) Patent No.: US 7,979,406 B2
(45) Date of Patent: Jul. 12, 2011

(54) COMPRESS TRANSACTION DATA USING SERIAL MICRO-TRENDS

(75) Inventors: Byron C. Gehman, Round Rock, TX (US); Kirk M. Sexton, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 591 days.

(21) Appl. No.: 12/139,899

(22) Filed: Jun. 16, 2008

(65) Prior Publication Data
US 2009/0313275 A1    Dec. 17, 2009

(51) Int. Cl.
*G06F 7/50* (2006.01)
(52) U.S. Cl. .......................... 707/703; 705/30
(58) Field of Classification Search ......... 707/700–704, 707/614–616; 705/30, 36 R, 26.1, 39; 709/219–224
See application file for complete search history.

(56) References Cited

U.S. PATENT DOCUMENTS

| | | | |
|---|---|---|---|
| 7,117,172 B1 * | 10/2006 | Black | 705/35 |
| 7,219,034 B2 | 5/2007 | McGee et al. | |
| 7,305,351 B1 | 12/2007 | Bechhofer et al. | |
| 7,346,476 B2 | 3/2008 | Levine et al. | |
| 7,369,954 B2 | 5/2008 | Levine et al. | |
| 2004/0078297 A1 * | 4/2004 | Veres et al. | 705/27 |
| 2006/0031466 A1 * | 2/2006 | Kovach | 709/224 |
| 2006/0212243 A1 * | 9/2006 | Levine et al. | 702/79 |
| 2008/0217400 A1 * | 9/2008 | Portano | 235/380 |
| 2008/0243715 A1 * | 10/2008 | Stellhorn et al. | 705/36 R |
| 2009/0216666 A1 * | 8/2009 | Antao et al. | 705/30 |

OTHER PUBLICATIONS

Biswas et al., "Memory Overflow Protection for Embedded Systems Using Run-Time Checks, Resuse, and Compression", ACM Transactions on Embedded Computing Systems, vol. 5, No. 4, Nov. 2006, pp. 719-752.
Papadimitriou et al., "Time Series Compressibility and Privacy", VLDB'07, ACM, Vienna, Austria, Sep. 23-28, 2007, pp. 459-470.
Wu et al., "Optimizing Bitmap Indices with Efficient Compression", ACM Transactions on Database Systems, vol. 31, No. 1, Mar. 2006, pp. 1-38.

* cited by examiner

*Primary Examiner* — Wilson Lee
(74) *Attorney, Agent, or Firm* — Francis Lammes; Stephen J. Walder, Jr.; Jeffrey S. LaBaw

(57) ABSTRACT

Compressing transaction data is provided. A current transaction data point is received. A determination is made as to whether the current transaction data point is a first transaction data point or a subsequent transaction data point of a set of transaction data points for a current variable length aggregation record. A further determination is made as to whether the subsequent transaction data point is within a predetermined tolerance of a predicted transaction data point in response to the current transaction data point being the subsequent transaction data point. The subsequent transaction data point is compressed into the current variable length aggregation record in response to the subsequent transaction data point falling within the predetermined tolerance of the predicted transaction data point.

20 Claims, 6 Drawing Sheets

COMPRESS TRANSACTION DATA USING SERIAL MICRO-TRENDS

BACKGROUND OF THE INVENTION

1. Field of the Invention

The present application relates generally to an improved data processing apparatus and method and more specifically to an apparatus and method for compressing transaction data using serial micro-trends.

2. Background of the Invention

With the evolution of the Internet and other e-Business systems, the monitoring of transactions is essential. Additionally, the monitoring of the quantity of transactions that occur is also essential, for example, the number of transactions each minute that are performed at a banking center or the number of hits that a Web site receives each minute. While the transactions are reduced to a specific number per minute, each transaction number or hit number requires memory space and, for Web sites that have numerous hits or form banking centers that process numerous transactions, the memory space required to store the transaction or hit data may be significant. However, when a system has a fixed amount of memory available, businesses are generally left to adding memory to their systems in order to record the data or deleting data that the company may eventually need at a later time. Either action taken by a company may result in a loss of time, money, or even unrecoverable data.

BRIEF SUMMARY OF THE INVENTION

In one illustrative embodiment, a method, in a data processing system, is provided for compressing transaction data. The illustrative embodiments receive a current transaction data point. The illustrative embodiments determine if the current transaction data point is a first transaction data point or a subsequent transaction data point of a set of transaction data points for a current variable length aggregation record. Responsive to the current transaction data point being the subsequent transaction data point, the illustrative embodiments determine if the subsequent transaction data point is within a predetermined tolerance of a predicted transaction data point. Responsive to the subsequent transaction data point falling within the predetermined tolerance of the predicted transaction data point, the illustrative embodiments compress the subsequent transaction data point into the current variable length aggregation record.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE INVENTION

Figure 1:
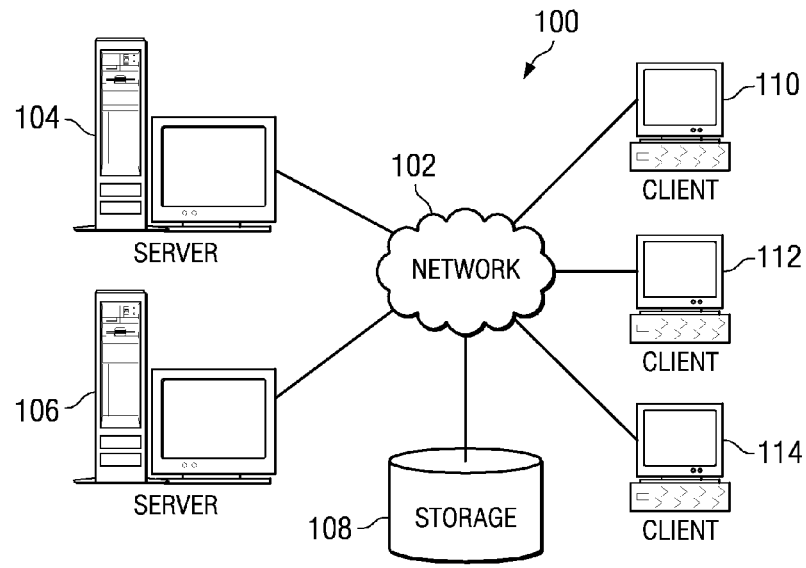
FIG. 1 depicts a pictorial representation of an exemplary distributed data processing system in which aspects of the illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The illustrative embodiments provide a mechanism for compressing transaction data using serial micro-trends. Since storing data associated with a transaction may require memory that may be at a premium, the illustrative embodiments provide for compressing data that fits a particular pattern to be compressed up to 99 percent while retaining up to 99 percent precision on any individual instance with regard to measured data. That is, the illustrative embodiments are directed to whether the measured data meets a determined expected value and, if the measured data meets the expected value, then most temporal information associated with the measured data is discarded.

Figure 2:
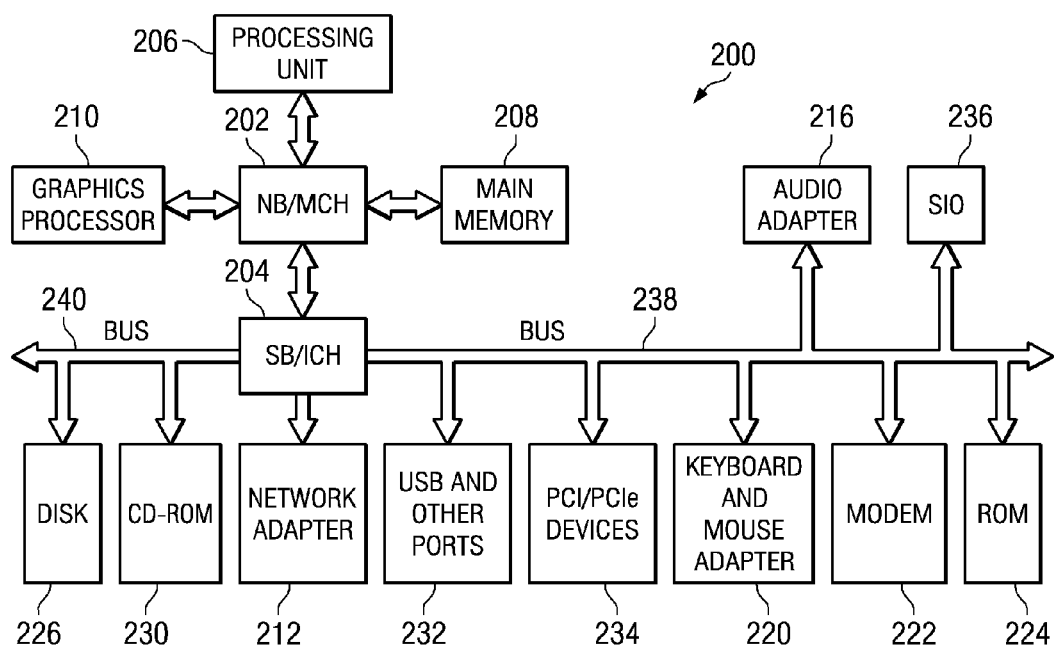
FIG. 2 shows a block diagram of an exemplary data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as exemplary environments in which exemplary aspects of the illustrative embodiments may be implemented. While the description following FIGS. 1 and 2 will focus primarily on a single data processing device implementation of a mechanism that compresses transaction data using serial micro-trends, this is only exemplary and is not intended to state or imply any limitation with regard to the features of the present invention. To the contrary, the illustrative embodiments are intended to include distributed data processing environments and embodiments in which multiple remote systems are monitored and aggregated monitoring data may or may not be stored at a central server. That is, the illustrative embodiments may be applied at a data collector (the entity that initially has the transaction information), an intermediary agent such as a managing agent that assembles data from multiple data collectors on the same host system, at a centralized server that is part of a larger infrastructure that services multiple agents, or even at the user interface level as a means to condense date required to build views and graphs. Many modifications to the depicted environments may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
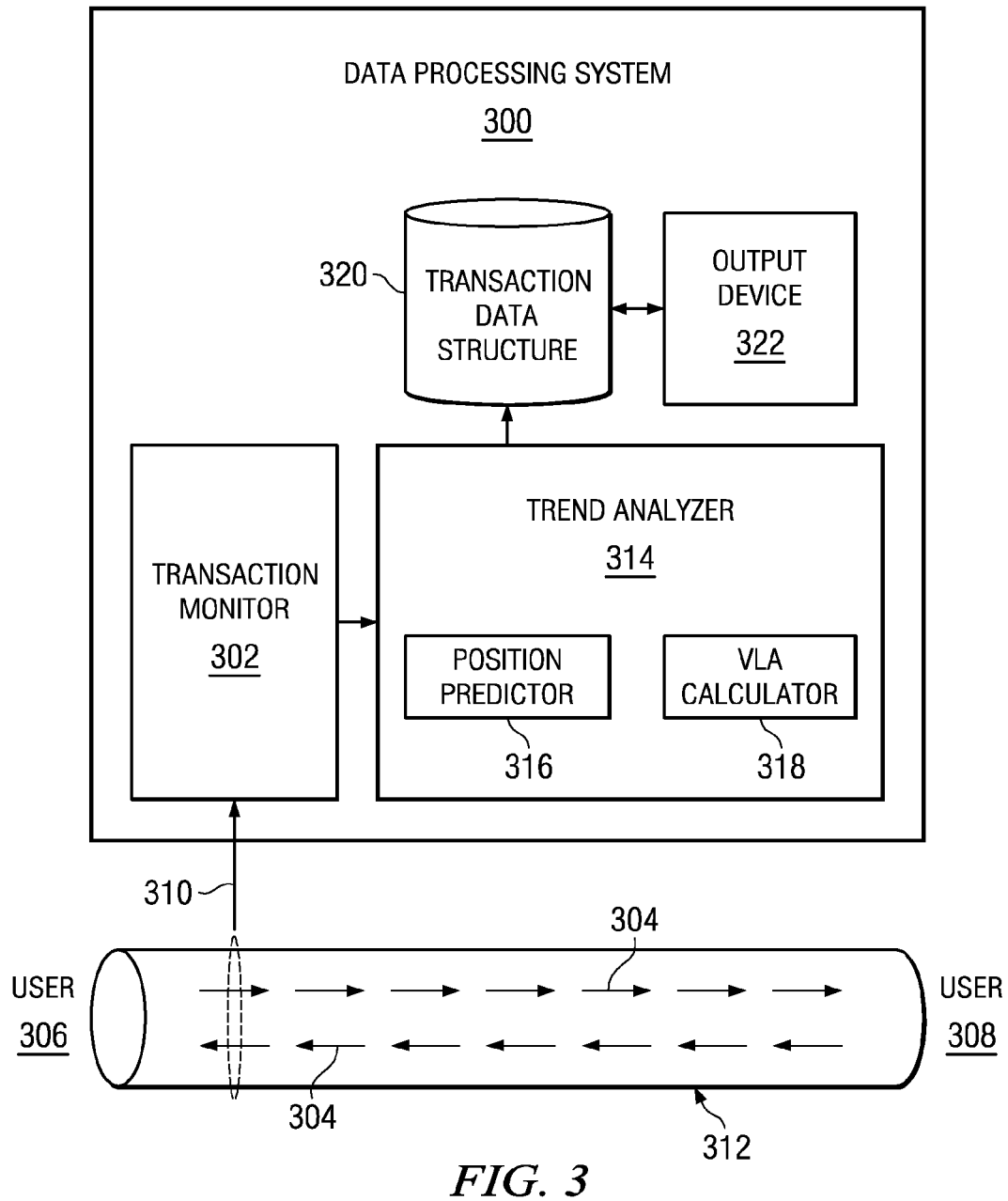
FIG. 3 depicts a data processing system that compresses transaction data using serial micro-trends in accordance with an illustrative embodiment.

FIG. 3 depicts a data processing system that compresses transaction data using serial micro-trends in accordance with an illustrative embodiment. Data processing system 300 may comprise transaction monitor 302 which monitors transactions 304 that are performed between user 306 and user 308 at transaction monitoring point 310 via transaction pathway 312. Transaction pathway 312 may be any type of communication path, such as a network, dedicated line, or the like. Users 306 and 308 may be individual users, businesses, systems, or a mix of any number of computing systems that are communicating with each other. Transaction monitoring point 310 may be a specific point along transaction pathway 312 where transactions 304 are detected. As transaction monitor 302 detects transactions 304 being performed, transaction monitor 302 passes information associated with each of transactions 304 to trend analyzer 314. The information associated with transactions 304 may be coordinates of the transaction data point, such as date, time, a measured metric, or the like, and may be "live" data from active monitoring or "post-processed" data from previously collected data, such as data that is stored in a database. In one example of the illustrative embodiments, the measured metric is the response-time of transactions 304. Trend analyzer 314 accepts the information associated with each of transactions 304 from transaction monitor 302.

Trend analyzer 314 may comprise position predictor 316 and variable length aggregate (VLA) calculator 318. Once position predictor 316 receives the detected transaction data point, position predictor 316 may perform one or more operations, which may be as follows:
1.) Initial condition—no VLA or VLA with 0 transaction data points, signal 'incomplete' VLA,
2.) VLA with 1 transaction data point, signal 'incomplete' VLA, or
3.) VLA with 2 or more subsequent transaction data points, signal 'complete' VLA.

Position predictor 316 accepts the first two detected transaction data points in the current VLA because, for a transaction data point to not be accepted, the transaction data point must not fit on a trend line. Once position predictor 316 has two or more sets of transaction data points for a current VLA record, then position predictor 316 calculates the best fitting line (trend line) through all sets of data points using a "least-squares" linear regression algorithm. The best fitting line is represented by the formula y=mx+b. Position predictor 316 then predicts the y-value (for example, a response-time metric, although the illustrative embodiments are not limited to response times and may be used for other statistics such as memory consumption of a process) of the current data point by calculating 'y' in the line equation using the observed 'x' (data/time of the current data-point). If the VLA has 0 transaction data points, no linear equation (y=mx+b) may be built. If the VLA has 1 transaction data point <x1, y1>, no linear equation may be built, but the VLA still represents the 1 transaction data point. If the VLA has 2 transaction data points <x1, y1>, <x2, y2>, the linear equation for the trend line is (y1−y2)=m(x1−x2)+b. If the VLA has 3 or more transaction data points, a least squares linear regression is used to represent the trend line.

Position predictor 316 passes this predicted transaction data (as well as the 'real' observed data point) point to VLA calculator 318 which determines if the 'real' detected transaction data point is within a tolerance or configurable percentage of the predicted transaction data point. For example, if previous transaction data points are (1,100), (2,110), (3,120), and (4,130), then position predictor 316 may predict the next transaction data point to be 140 (at time/X of 5) using the line formula—note: position predictor 316 would also "predict" at time 6, the value of 150. Both (5,140) and (6,150), etc., lie on the exact same line. The illustrative embodiments do not require data coming in on specific predetermined time-intervals, but does require the incoming data to be processed in order. If the actual detected transaction data point is (5,136) and the tolerance is 90 percent, then VLA calculator 318 may compress the detected transaction data point into the current VLA record, which consists of a starting transaction data point and the associated line formula (based on linear regression). At time "5", with a tolerance of 90%, the acceptable range for y would be [127-154]. However, if the actual detected transaction data point is (5,125) and the tolerance is 90 percent, then VLA calculator 318 may save the current VLA record to transaction data structure 320 and create a new VLA record using the detected transaction data point, as the first transaction data point of a VLA is always the "abnormal" point that could not be compressed by the previous VLA. Then once two or more transaction data points are recorded and a new line slope is determined, VLA calculator 318 will associate the line slope with the newly recorded transaction data points and save the line slope to transaction data structure 320.

If the actual detected transaction data point is within the tolerance and VLA calculator 318 has compressed the detected transaction data point into the current VLA record, then VLA calculator 318 waits for position predictor 316 to send the next predicted transaction data point when a new data-point is observed. When a new data-point is observed, position predictor 316 uses the observed x-value (date/time) of the transaction data point to predict the "expected" y-value (response-time metric). If the expected y-value is too far removed from the "actual/observed" y-value, then a new VLA is created and the point is not compressed. For example, if the linear micro trend of N data points is represent by the equation y=f(x)=mx+b, and the first data point is <x0, y0>, and if the next data point to consider is <xN, yN>, then the predicted value is f(xN)=m*xN+b. If the tolerance is t, then if |(f(xN)−yN)/yN|>t, the next data point will not be included in the current VLA (assuming it already has 2 data points from which <m, b> can be determined). Otherwise, an updated trend line is computed <mN, bN> and the first data point <x0, y0> is put into the predictor to make sure it still falls within tolerance levels. Using all of the sets of detected transaction data points for the current VLA record, position predictor 316 uses the sets of detected transaction data points to update the linear regression line and predict the next transaction data point.

In another embodiment, once VLA calculator 318 has confirmed that the detected transaction data point is within the tolerance and prior to VLA calculator 318 compressing the detected transaction data point into the current VLA record, VLA calculator 318 may be required to perform an accuracy confirmation. If the accuracy confirmation is required, VLA calculator 318 may request that position predictor 316 perform an updated prediction using the first detected transaction data point. Once VLA calculator 318 receives the temporarily updated trend line, VLA calculator 318 may recheck that the first transaction data point is within a tolerance or configurable percentage of the temporarily updated trend line. Performing this recheck may provide another level of accuracy to the compression of transaction data. If the initial transaction data point is within tolerance of the temporarily updated trend line, then VLA calculator 318 will compress the current detected transaction data point into the current VLA record; otherwise, VLA calculator 318 will save the current VLA record to transaction data structure 320 and create a new VLA record using the detected transaction data point.

Thus, within the illustrative embodiments, transaction data structure 320 only records the first transaction data point and linear slope associated with the current VLA record. For example, in a system where 500 transaction data points are detected, known systems would record all 500 transaction data points. However, in the illustrative embodiments, if all 500 transaction data points are within a 90% tolerance, only one transaction data point would be recorded and an associated linear slope (the slope being the m and b variables in the line equation y=mx+b). A few other items of information may also be saved with a VLA record, such as the number of transaction data points the VLA represents, the max of x, or the like. Minimally, the VLA stores the first data point <x0, y0> and the linear equation of the trend line <m, b> of the equation y=mx+b. As other transaction data points are aggregated into the current VLA record, the linear expression associated with the VLA record is extended. Once a new VLA record is created, position predictor 316 resets so that a new prediction may be made for the new VLA record.

Once again, the tolerance is configurable by the user. If the user desires a greater compression ratio of the transaction data, then the user may use more tolerance, for example, 85 percent as opposed to the 90 percent illustrated above. However, if the user desires higher accuracy as a tradeoff to compression, then the user may use less tolerance, for example, 95 percent as opposed to the 90 percent illustrated above. The user may then analyze the transaction data recorded in transaction data structure 320 using output device 322, which is illustrated in FIGS. 4A, 4B, and 4C.

Figure 4A:
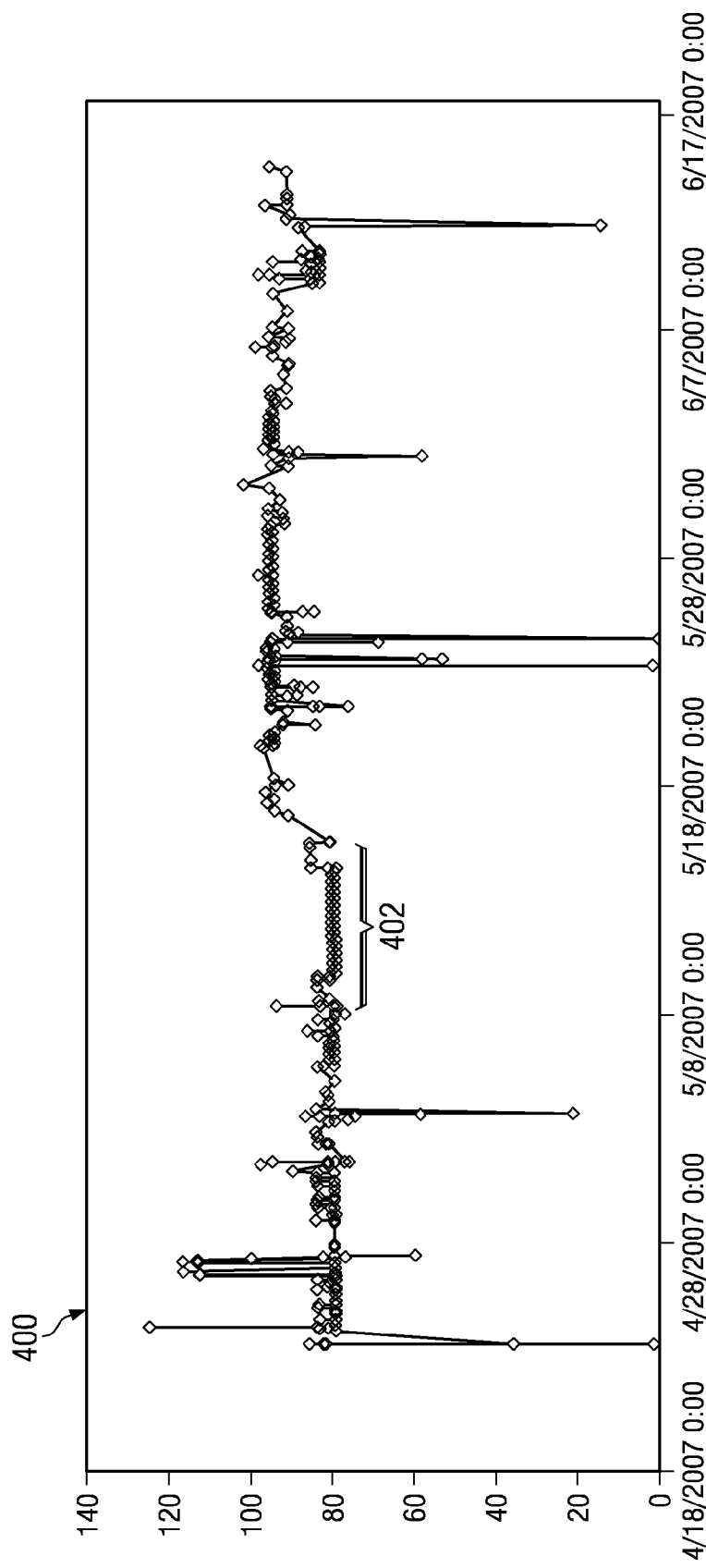
FIGS. 4A, 4B, and 4C provide an exemplary illustration of transaction data compression in accordance with an illustrative embodiment.
Figure 4B:
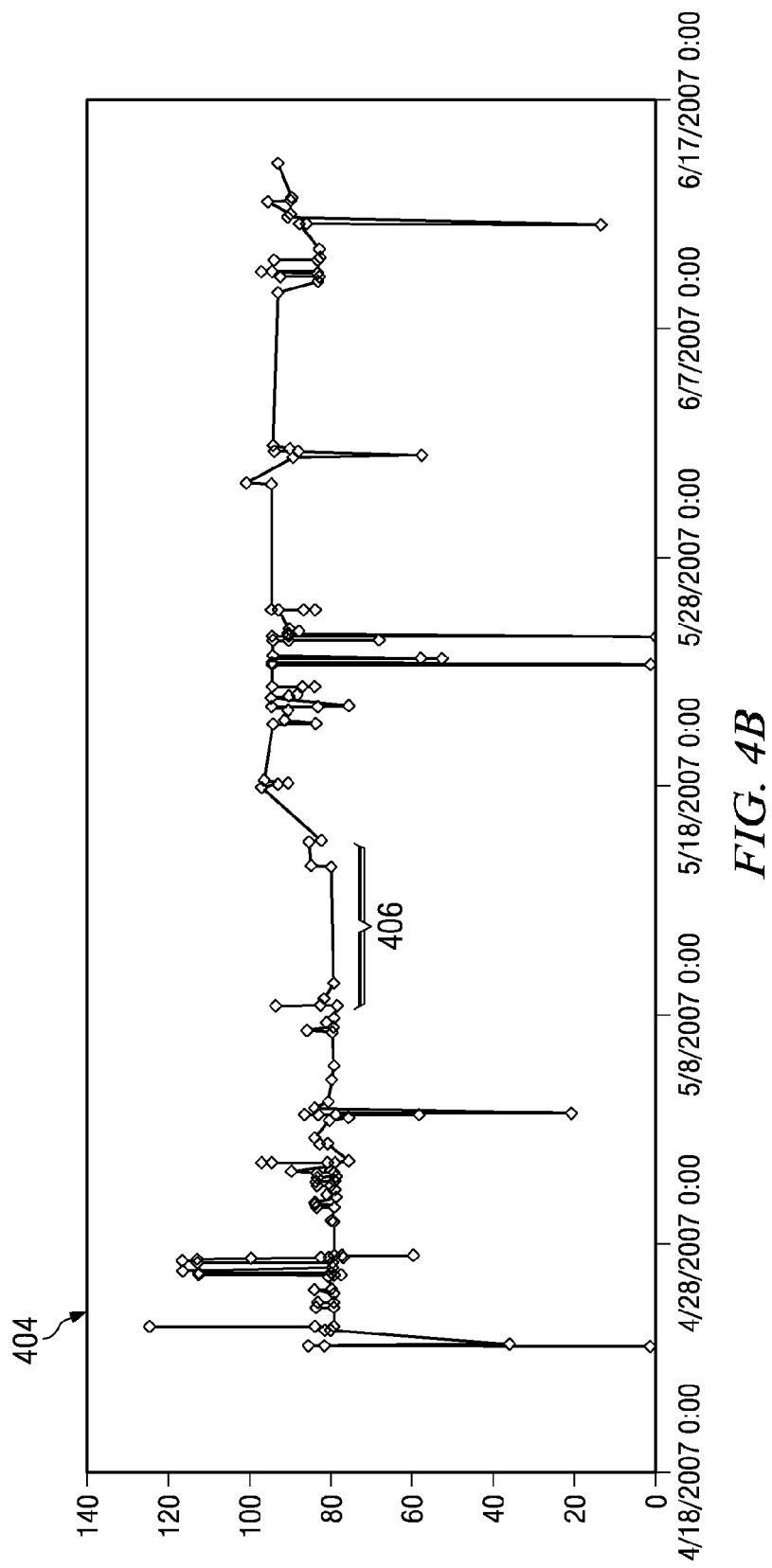
Figure 4C:
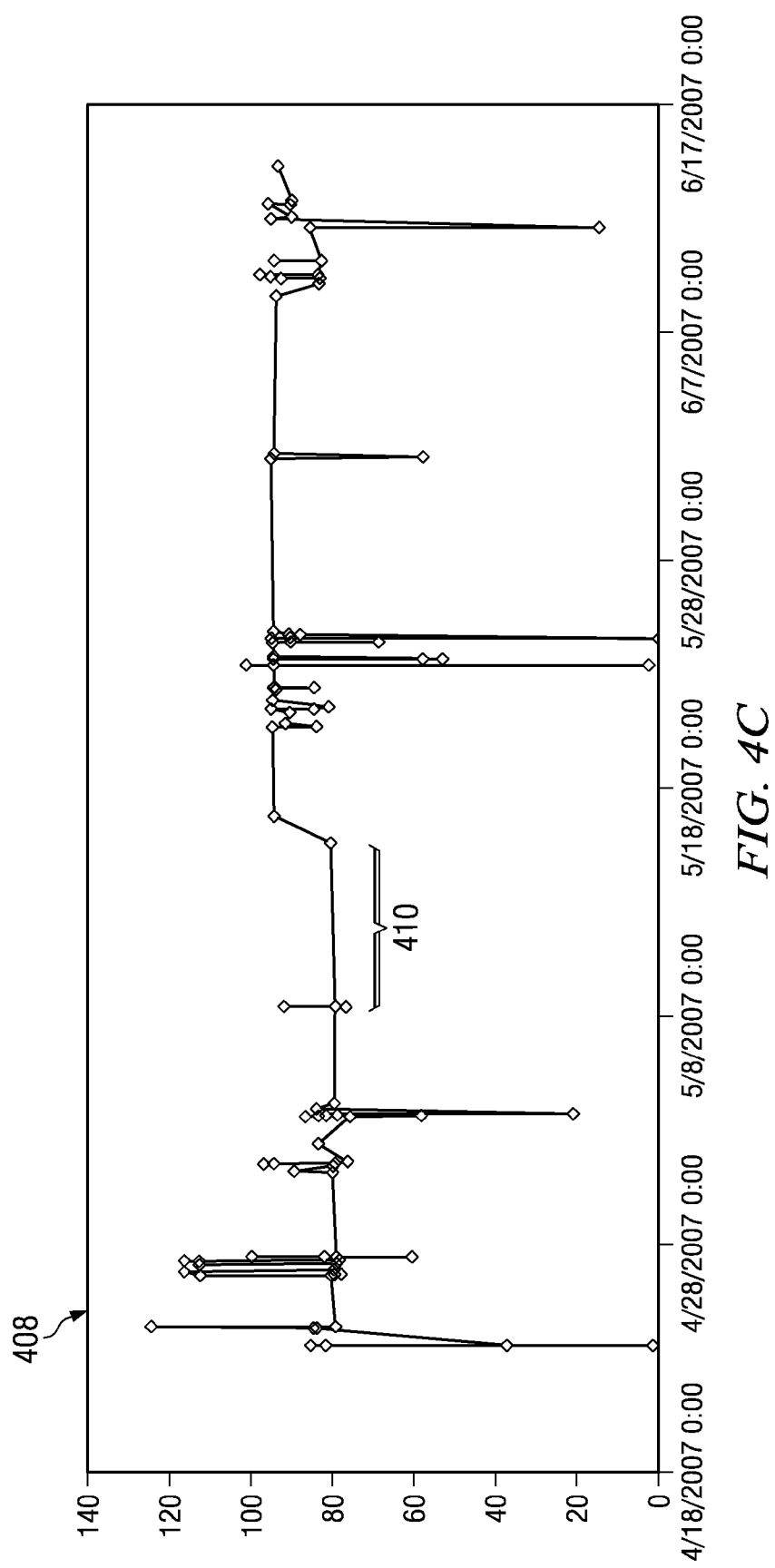

FIGS. 4A, 4B, and 4C provide an exemplary illustration of transaction data compression in accordance with an illustrative embodiment. Graph 400 in FIG. 4A comprises 5420 transaction data records at 100 percent accuracy. That is, graph 400 illustrates RAW data as no VLAs were used to generate graph 400 and, as such, since the user desired 100 percent accuracy, no compression was provided so each transaction data point that was detected was recorded in the transaction data structure. In identified section 402 of graph 400, there are 1724 RAW transaction data records. As discussed previously, the number of transaction data records may be reduced by using transaction data compression. FIG. 4B illustrates graph 404 that would be produced using the previously described transaction data compression mechanism at a 95 percent tolerance. Using this transaction data compression mechanism, graph 404 comprises only 216 VLA data records. In identified section 406 of graph 404, which has the same time interval of identified section 402 of graph 400 in FIG. 4A, there are 11 VLA data records (1724 RAW data records were compressed into 11 VLA records). FIG. 4C illustrates graph 408 that would be produced using the previously described transaction data compression mechanism at a 90 percent tolerance. Using this transaction data compression mechanism, graph 408 comprises only 136 VLA data records. In identified section 410 of graph 408, which has the same time interval of identified sections 402 and 406 of graph 400 in FIGS. 4A and 402 in FIG. 4B respectively, there are only 3 VLA data records (1724 RAW data records were compressed into 3 VLA records).

Thus, as is illustrated in graphs 404 and 408, similar graphs may be obtained as compared to graph 400 using a transaction data compression mechanism while memory space, which may be at a premium to the user, is conserved. The use of a variable length aggregate mechanism provides for compression of normal transaction data, while maintaining abnormal transaction data, this is the data that does not fit the calculated linear regression trend line. While known systems may use fixed-length aggregate mechanisms to compress transaction data, the fixed-length aggregate mechanisms merely average abnormal transaction data along with normal transaction data. The use of a variable length aggregate mechanism provides for keeping abnormal transaction data separate from normal transaction data.

Figure 5:
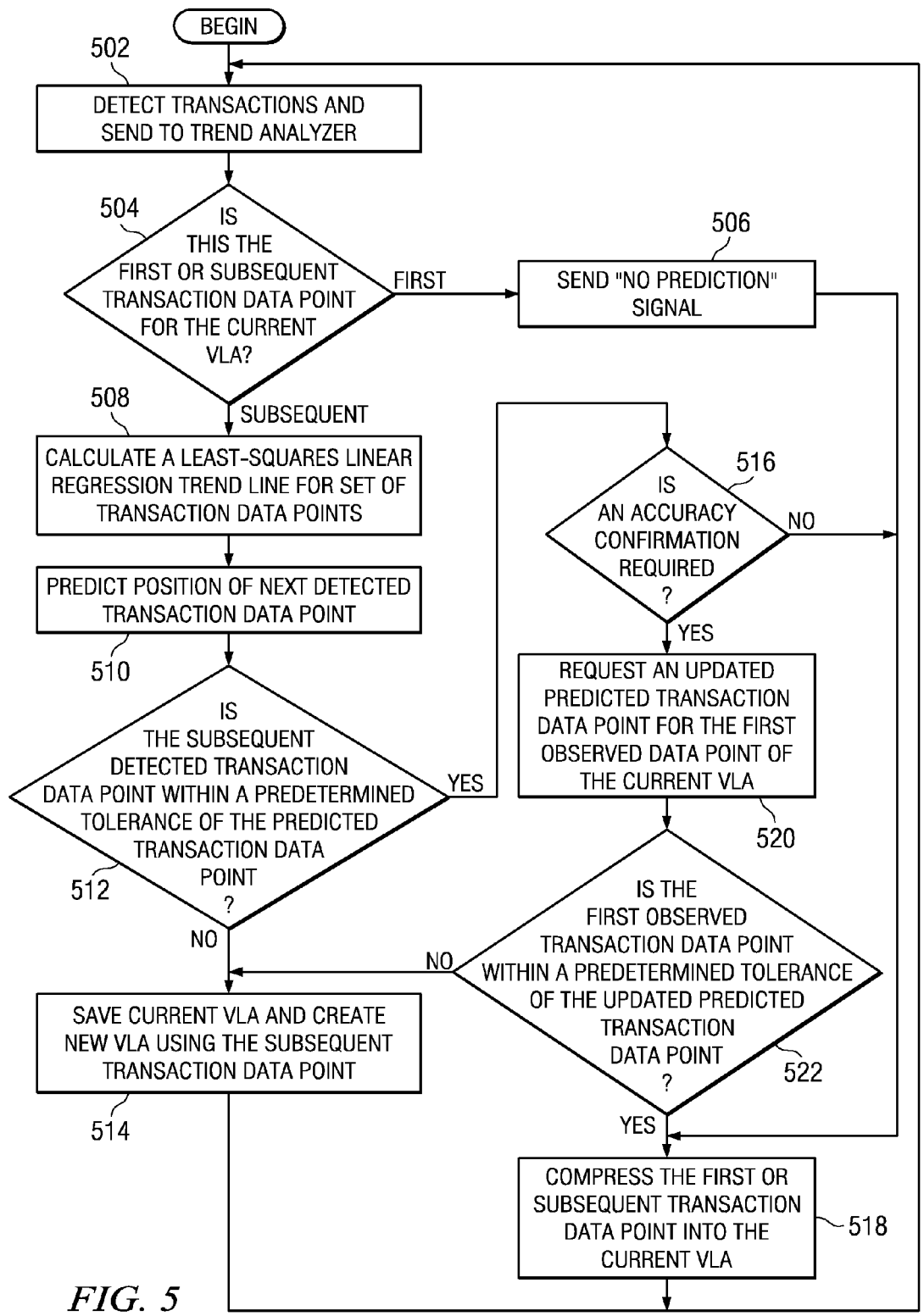
FIG. 5 is an exemplary flow diagram of an operation for compressing transaction data in accordance with one illustrative embodiment.

FIG. 5 is an exemplary flow diagram of an operation for compressing transaction data in accordance with one illustrative embodiment. As the operation begins, a monitor captures the date/time of a transaction and the response time of the transaction and passes the detected transaction data point to a trend analyzer (step 502). Again, in the illustrative embodiments the response-time is merely a metric used as an example and the illustrative embodiments are not limited to "aggregating" only by response time. A position predictor within the trend analyzer determines if the detected transaction data point is the first or subsequent transaction data point for a current variable length aggregation (VLA) record (step 504). If at step 504 the detected transaction data point is the first transaction data point for the current VLA record, then the position predictor passes a "No Prediction" signal to the VLA calculator within the trend analyzer (step 506), and the operation proceeds to step 518.

If at step 504 the detected transaction data point is a subsequent transaction data point for a current VLA record, then the position predictor calculates the least-squares linear regression trend line associated with the set of transaction data points (step 508)—the set of transaction data points are not stored, but rather the running variables needed to calculated the trend line. The position predictor then calculates the expected y-value of the subsequent transaction data point using the observed date/time (x-value) of the current data point against the linear regression line formula (step 510). The VLA calculator then determines if the subsequent detected transaction data point is within a predetermined tolerance of the predicted transaction data point (step 512). If at step 512 the subsequent detected transaction data point is not within the predetermined tolerance of the predicted transaction data point, then the VLA calculator saves the current VLA record (without updating it with the current observed data point) to a transaction data structure and then creates a new VLA record using the subsequent transaction data point (step 514), with the operation retuning to step 502 thereafter.

If at step 512 the subsequent detected transaction data point is within a predetermined tolerance of the predicted transaction data point, then the VLA calculator determines if an accuracy conformation is required (step 516). If at step 516 an accuracy confirmation is not required or from step 504 where the detected transaction data point is the first transaction data point for the current VLA record, the VLA calculator will then compress the detected transaction data point into the current VLA record (step 518), with the operation retuning to step 502 thereafter. If at step 516 an accuracy confirmation is required, then the VLA calculator will request that the position predictor perform an updated prediction of the first observed data point for the current VLA against a 'temporarily' updated trend line taking into account the current detected transaction data point (step 520). This is to ensure that the trend-line is not gradually sloping away from the first observed data point and hence increasing error.

Once the VLA calculator receives the temporarily updated trend line, the VLA calculator determines if the first detected transaction data point is within a predetermined tolerance of the temporarily updated trend line. If at step 522 the first detected transaction data point is not within the predetermined tolerance of the temporarily updated trend line, then the operation proceeds to step 514. If at step 522 the first detected transaction data point is within the predetermined tolerance of the temporarily updated trend line, then the operation proceeds to step 518.

Thus, the mechanisms of the illustrative embodiments record the first transaction data point and linear slope associated with the current VLA record. If the user desires a greater compression ratio of the transaction data, then the user may configure more tolerance to error. If the user desires higher accuracy as a tradeoff to compression, then the user may configure less tolerance to error. Using a variable length aggregate mechanism provides for compression of normal transaction data, while maintaining abnormal transaction data. Additionally, using a variable length aggregate mechanism provides for keeping abnormal transaction data separate from normal transaction data.

As noted above, it should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for compressing transaction data, the method comprising:
   receiving a current transaction data point;
   determining if the current transaction data point is a first transaction data point or a subsequent transaction data point of a set of transaction data points for a current variable length aggregation record;
   responsive to the current transaction data point being the subsequent transaction data point, determining if the subsequent transaction data point is within a predetermined tolerance of a predicted transaction data point; and
   responsive to the subsequent transaction data point falling within the predetermined tolerance of the predicted transaction data point, compressing the subsequent transaction data point into the current variable length aggregation record.

2. The method of claim 1, further comprising:
   responsive to the current transaction data point being the first transaction data point, compressing the current transaction data point into the current variable length aggregation record.

3. The method of claim 1, further comprising:
   responsive to the subsequent transaction data point falling outside the predetermined tolerance of the predicted transaction data point, saving the current variable length aggregation record to a transaction data structure; and
   creating a new variable length aggregation record using the subsequent transaction data point to replace the current variable length aggregation record.

4. The method of claim 1, further comprising:
   calculating a least-squares linear regression trend line using the set of transaction data points for the current variable length aggregation record; and
   predicting the position of a next detected transaction data point using the generated trend line.

5. The method of claim 1, further comprising:
   determining if an accuracy confirmation is required;
   responsive to the accuracy confirmation being required, requesting an updated predicted transaction data point against a first observed transaction data point;
   responsive to receiving the updated predicted transaction data point, determining if the first observed transaction data point is within the predetermined tolerance of the temporarily updated trend line; and
   responsive to the first transaction data point falling within the predetermined tolerance of the temporarily updated trend line, compressing the subsequent transaction data point into the current variable length aggregation record.

6. The method of claim 5, further comprising:
   responsive to the first transaction data point falling outside the predetermined tolerance of the temporarily updated trend line, saving the current variable length aggregation record to a transaction data structure; and
   creating a new variable length aggregation record using the subsequent transaction data point to replace the current variable length aggregation record.

7. The method of claim 5, further comprising:
   calculating the temporarily updated trend line using the least-squares linear regression trend line and the first observed transaction data point; and
   predicting the updated predicted transaction data point using the temporarily updated trend line.

8. A computer program product comprising a non-transitory computer recordable storage medium having a computer readable program recorded thereon, wherein the computer readable program, when executed on a computing device, causes the computing device to:
   receive a current transaction data point;
   determine if the current transaction data point is a first transaction data point or a subsequent transaction data point of a set of transaction data points for a current variable length aggregation record;
   responsive to the current transaction data point being the subsequent transaction data point, determine if the subsequent transaction data point is within a predetermined tolerance of a predicted transaction data point; and
   responsive to the subsequent transaction data point falling within the predetermined tolerance of the predicted transaction data point, compress the subsequent transaction data point into the current variable length aggregation record.

9. The computer program product of claim 8, wherein the computer readable program further causes the computing device to:
   responsive to the current transaction data point being the first transaction data point, compress the current transaction data point into the current variable length aggregation record.

10. The computer program product of claim 8, wherein the computer readable program further causes the computing device to:
    responsive to the subsequent transaction data point falling outside the predetermined tolerance of the predicted transaction data point, save the current variable length aggregation record to a transaction data structure; and create a new variable length aggregation record using the subsequent transaction data point to replace the current variable length aggregation record.

11. The computer program product of claim 8, wherein the computer readable program further causes the computing device to:

calculate a least-squares linear regression trend line using the set of transaction data points for the current variable length aggregation record; and predict the position of a next detected transaction data point using the generated trend line.

12. The computer program product of claim 8, wherein the computer readable program further causes the computing device to:

determine if an accuracy confirmation is required;

responsive to the accuracy confirmation being required, request an updated predicted transaction data point against a first observed transaction data point;

responsive to receiving the updated predicted transaction data point, determine if the first observed transaction data point is within the predetermined tolerance of the temporarily updated trend line; and responsive to the first transaction data point falling within the predetermined tolerance of the temporarily updated trend line, compress the subsequent transaction data point into the current variable length aggregation record.

13. The computer program product of claim 12, wherein the computer readable program further causes the computing device to:

responsive to the first transaction data point falling outside the predetermined tolerance of the temporarily updated trend line, save the current variable length aggregation record to a transaction data structure; and create a new variable length aggregation record using the subsequent transaction data point to replace the current variable length aggregation record.

14. The computer program product of claim 12, wherein the computer readable program further causes the computing device to:

calculate the temporarily updated trend line using the least-squares linear regression trend line and the first observed transaction data point; and predict the updated predicted transaction data point using the temporarily updated trend line.

15. An apparatus, comprising:

a processor; and a memory coupled to the processor, wherein the memory comprises instructions which, when executed by the processor, cause the processor to:

receive a current transaction data point;

determine if the current transaction data point is a first transaction data point or a subsequent transaction data point of a set of transaction data points for a current variable length aggregation record;

responsive to the current transaction data point being the subsequent transaction data point, determine if the subsequent transaction data point is within a predetermined tolerance of a predicted transaction data point; and responsive to the subsequent transaction data point falling within the predetermined tolerance of the predicted transaction data point, compress the subsequent transaction data point into the current variable length aggregation record.

16. The apparatus of claim 15, wherein the instructions further cause the processor to:

responsive to the current transaction data point being the first transaction data point, compress the current transaction data point into the current variable length aggregation record.

17. The apparatus of claim 15, wherein the instructions further cause the processor to:

responsive to the subsequent transaction data point falling outside the predetermined tolerance of the predicted transaction data point, save the current variable length aggregation record to a transaction data structure; and create a new variable length aggregation record using the subsequent transaction data point to replace the current variable length aggregation record.

18. The apparatus of claim 15, wherein the instructions further cause the processor to:

calculate a least-squares linear regression trend line using the set of transaction data points for the current variable length aggregation record; and predict the position of a next detected transaction data point using the generated trend line.

19. The apparatus of claim 15, wherein the instructions further cause the processor to:

determine if an accuracy confirmation is required;

responsive to the accuracy confirmation being required, request an updated predicted transaction data point against a first observed transaction data point;

responsive to receiving the updated predicted transaction data point, determine if the first observed transaction data point is within the predetermined tolerance of the temporarily updated trend line; and responsive to the first transaction data point falling within the predetermined tolerance of the temporarily updated trend line, compress the subsequent transaction data point into the current variable length aggregation record.

20. The apparatus of claim 19, wherein the instructions further cause the processor to:

responsive to the first transaction data point falling outside the predetermined tolerance of the temporarily updated trend line, save the current variable length aggregation record to a transaction data structure; and create a new variable length aggregation record using the subsequent transaction data point to replace the current variable length aggregation record.

\* \* \* \* \*